United States Patent [19] [11] 4,172,225
Woldseth et al. [45] Oct. 23, 1979

[54] ALPHA PARTICLE X-RAY ENERGY ANALYSIS SYSTEM

[75] Inventors: Rolf Woldseth, Foster City; Duane A. Spence, Hillsborough, both of Calif.

[73] Assignee: Kevex Corporation, Foster City, Calif.

[21] Appl. No.: 867,812

[22] Filed: Jan. 9, 1978

[51] Int. Cl.² .............................................. H01J 37/02
[52] U.S. Cl. .................................... 250/306; 250/309; 250/397; 250/370
[58] Field of Search ............... 250/306, 308, 309, 310, 250/396, 397, 398, 399, 370; 313/359, 361, 54, 156

[56] References Cited
U.S. PATENT DOCUMENTS

| 3,056,027 | 9/1962 | Martinelli | 250/308 |
|---|---|---|---|
| 3,370,167 | 2/1968 | Sterk | 250/309 |
| 3,471,694 | 10/1969 | Poen | 250/310 |
| 3,567,928 | 3/1971 | Davies et al. | 250/310 |
| 3,614,424 | 10/1971 | Openshaw | 250/310 |

Primary Examiner—Bruce C. Anderson

[57] ABSTRACT

A high resolution alpha particle x-ray energy analysis system, particularly useful in detecting light elements, is disclosed wherein magnetic or electrostatic suppression fields prevent charged particles that create background radiation from reaching a windowless energy dispersive x-ray detector.

11 Claims, 7 Drawing Figures

ALPHA PARTICLE X-RAY ENERGY ANALYSIS SYSTEM

BACKGROUND

In x-ray spectrometry, compositional analysis of sample material is performed by identification of the characteristic x-rays emitted by each constituent atomic element during irradiation of the sample by electrons, x-rays, or ions. In 1913 J. Chadwick provided the first documented evidence that characteristic x-rays are generated by bombarding a sample with alpha particles emitted from a radioactive isotope. See J. Chadwick, Phil. Mag. 25, 193 (1913). When alpha particles strike the sample, atoms in the specimen are excited by the transfer of energy from the alpha particles and they emit characteristic x-rays or Auger electrons upon their de-excitation without high background x radiation that accompanies electron excited analysis. The x-rays are detected by an energy dispersive detector, their energy levels determined and subsequently analyzed. One system for alpha ray excited compositional analysis has been patented in U.S. Pat. No. 3,408,496 to Sellers, et al.

In addition to the characteristic x-rays, energetic electrons may be emitted from the sample under analysis and ionized particles may be produced from the residual atmosphere within the system or from the radioactive source itself. Impingement of any of these charged particles upon the detector produces an undersirable continuum of energy distributed throughout the x-ray spectrum in the form of background radiation which limits the sensitivity of the analysis. The thin beryllium window that usually protects solid state x-ray detectors absorbs most of the unwanted particles and thereby lowers the general level of background radiation. However, the beryllium windows also absorb the very low energy x-ray photons emitted by light atomic elements such as carbon, nitrogen, and oxygen. This invention eliminates the undersirable particle-induced background with magnetic or electrostatic fields and, hence, the need for the beryllium window absorber. Thus, a windowless detector has been used to detect, with very low background radiation, clearly resolved characteristic K-lines of the elements boron, carbon, nitrogen, oxygen, fluorine, sodium, and magnesium, as well as the L and M characteristic emission of other elements in the same energy region.

SUMMARY OF THE INVENTION

In the system of this invention, alpha particles emitted from a radioactive isotope impinge upon the sample under analysis. A windowless energy dispersive solid state detector, such as lithium drifted silicon, detects the x-ray fluorescence from the sample. Either a magnetic or an electromagnetic suppression field or a combination of both prevents unwanted charged particles from reaching the detector. The suppression field is positioned between the sample under analysis and the x-ray detector acting transversely to the path of the emitted characteristic x-rays to deflect charged particles and thus low background radiation by preventing them from striking the detector. The suppression field has no effect upon the x-ray energy radiated from the sample material to the detector.

The principal object of this invention is to provide an alpha particle x-ray energy analysis system which eliminates particle-induced background radiation in an energy dispersive x-ray detector and permits compositional analysis of samples containing elements of low atomic weight located anywhere from the surface to the full penetration range of the alpha particle.

Another object of the invention is to provide a high resolution x-ray energy analysis system for efficient generation and for clear resolution of characteristic K-lines of the elements nitrogen, carbon, oxygen, fluorine, sodium, magnesium, and aluminum.

Still another object of the invention is to provide an alpha particle x-ray energy analysis system wherein an alpha particle beam is scanned over the sample to provide spatially resolved analysis of the sample.

One other object of the invention is to provide an alpha particle analysis system which employs both x-ray and Auger electron yields to ascertain the depth in the sample wherein constituent elements are located.

Other objects and advantages will become apparent to those familiar with this art upon consideration of the following description and accompanying drawings.

IN THE DRAWINGS

Figure 1:
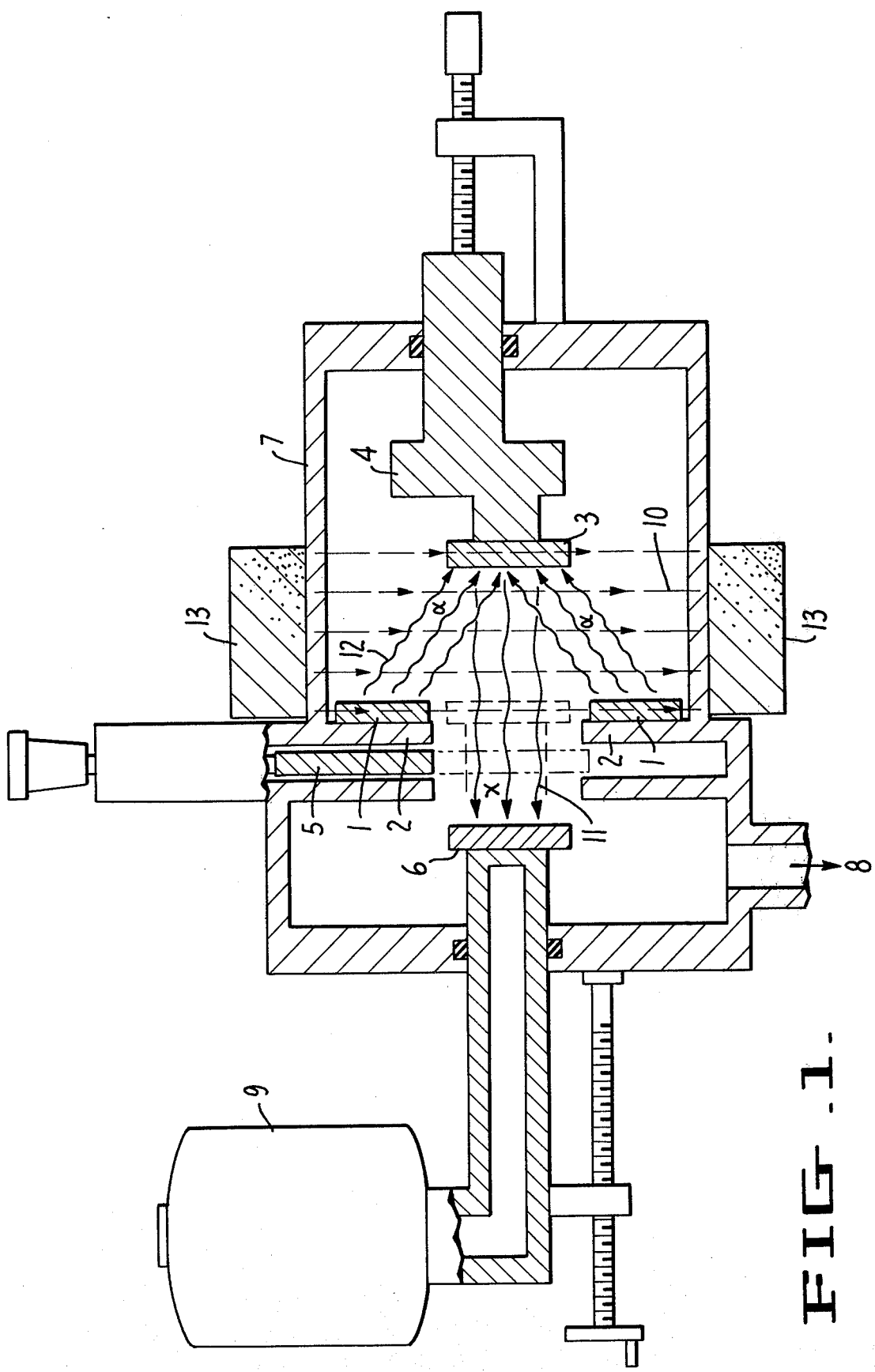
FIG. 1 is a schematic cross-sectional elevation of one embodiment of the system showing the relative location of a solid state alpha particle source, the sample under analysis, the detector, the charged particle suppression field and the evacuated enclosure for them.
Figure 5:
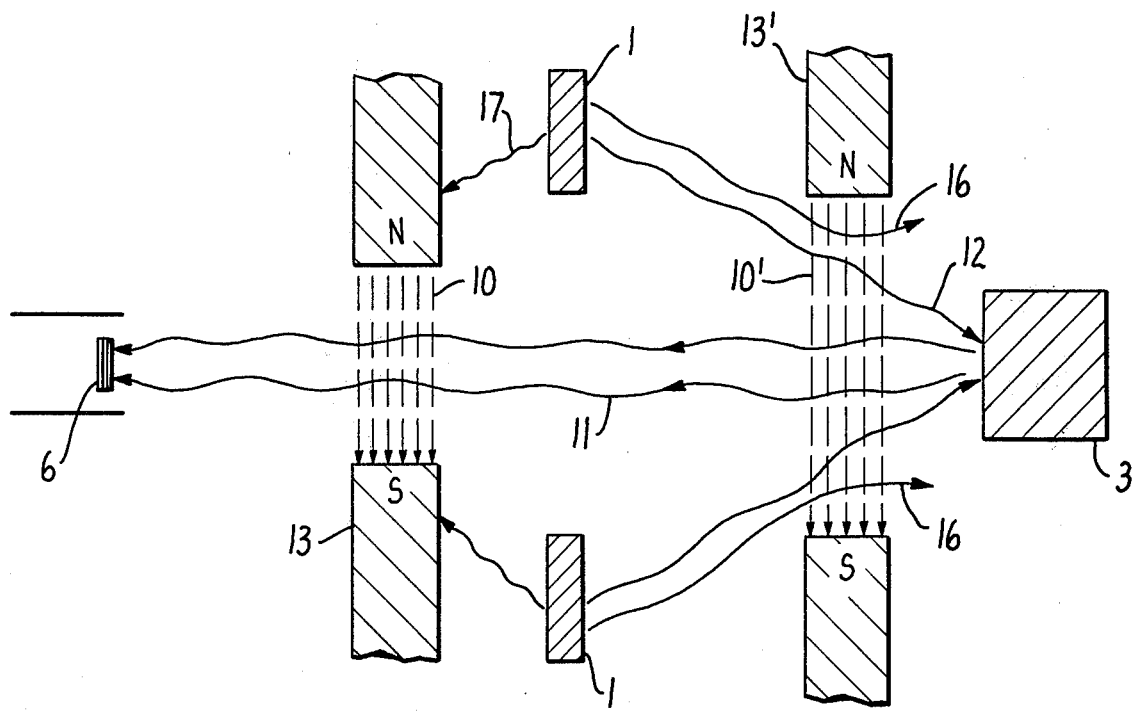
Figure 6:
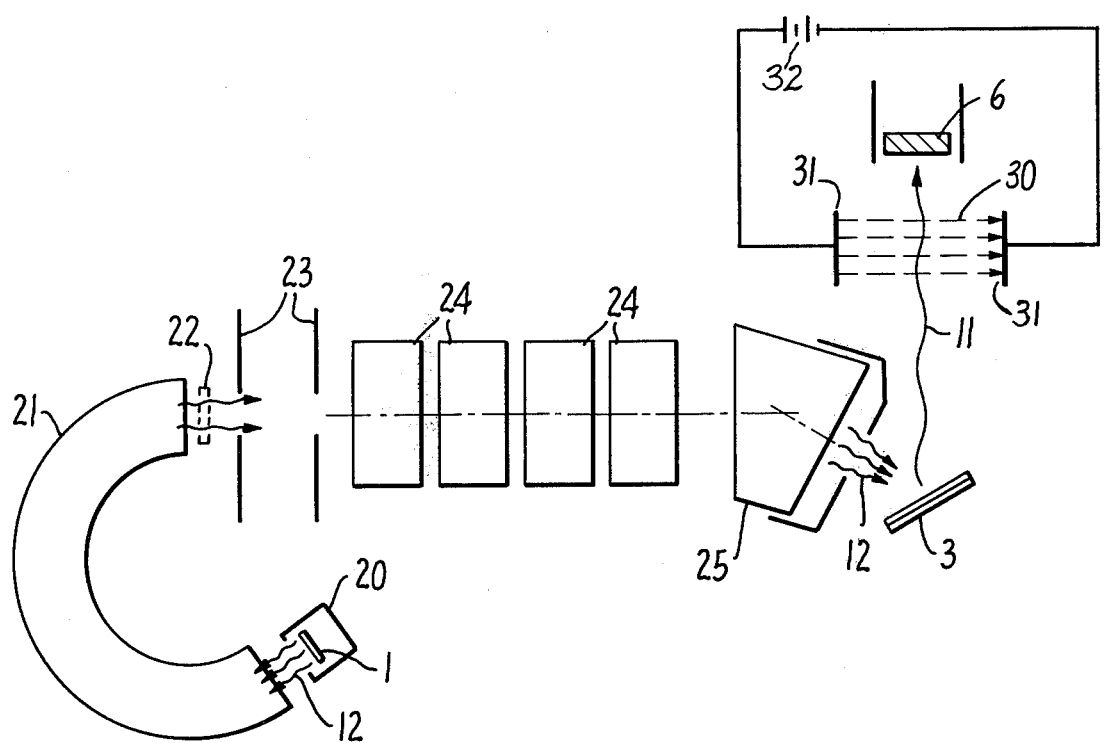

FIG. 5 is a schematic illustration of the system of FIG. 1 including a suppression field located between the alpha particle source and sample wherein the first suppression field forming magnet shields the detector from charged particle radiation emitted from the alpha source or the irradiated sample; and FIG. 6 illustrates the system of FIG. 1 wherein the alpha particle source is remote from the evacuated enclosure for the sample and detector to permit scanning of an alpha particle beam.

Figure 7:
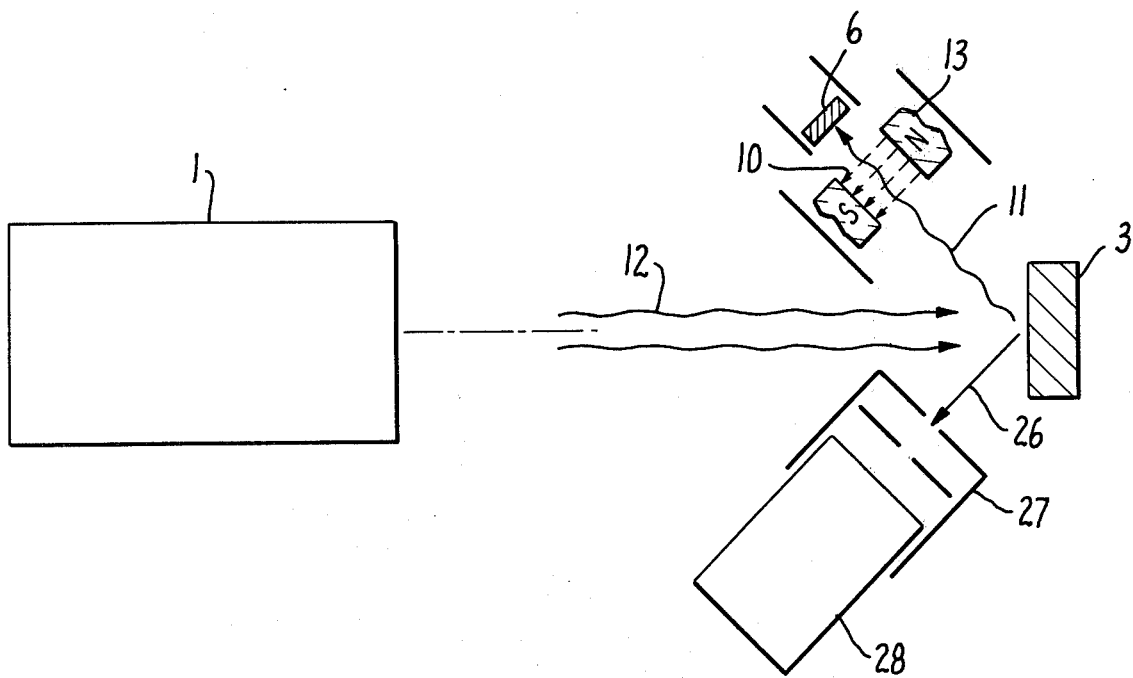

FIG. 7 is a schematic illustration of a modification of the invention employing simultaneous Auger electron and x-ray energy analysis.

DESCRIPTION OF PREFERRED EMBODIMENT

Figure 3:
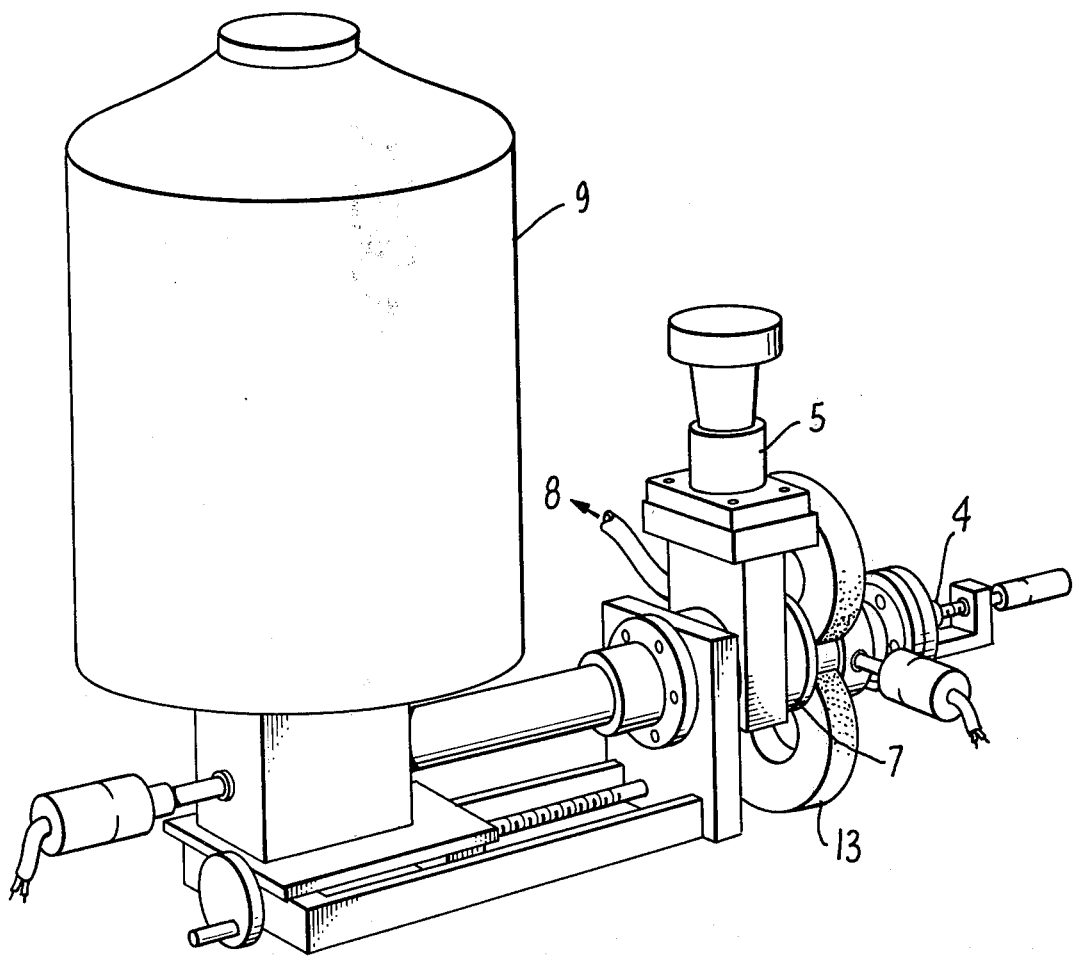
FIG. 3 is a perspective view of a prototype of the system illustrated schematically in FIG. 1.

FIG. 1 is a schematic representation of one embodiment of the alpha particle x-ray energy analysis system of this invention and FIG. 3 illustrates a prototype construction of it. Alpha particles 12 emitted from the radioisotope in the alpha particle source 1 impinge upon the sample 3 being analyzed using suitable shielding collimators 2 to limit the field of view. The atoms of the sample 3 are excited by the transfer of energy from the alpha particles 12 and characteristic x-rays 11 are emitted upon their de-excitation. These x-rays travel to the detector 6 where their energies are detected and subsequently analyzed by electronic means not shown.

A charged particle suppression field 10 acting transversely to the path of characteristic x-rays 11 between the sample 3 and the detector 6, while having no affect upon x-rays 11, deflects unwanted charged particles from the residual atmosphere or from the sample into the collimators or evacuated chamber walls to prevent them from striking the detector 6.

Inclusion of the sample, source and detector within evacuated chamber 7 evacuated by a vacuum pump at 8 limits the amount of contaminant condensation on the sensitive detector surface which is cooled to approximately liquid nitrogen temperature by a cryostat 9. In addition, the rarified atmosphere produces fewer ionized particles by collision and ionization caused by the radiation from the source 1, thereby lowering the background caused by such events. This also reduces wanted signal attenuation. The vacuum also limits the number of scatter events between the sample 3 and detector 6. Such scatter events occur when the characteristic x-rays 11 emitted by the sample 3 strike atmospheric molecules and lose part of their energy. This degrades the quality of the sharply defined spectral lines and increases the background radiation. An optional vacuum gate valve 5 maintains vacuum at the detector 6 during those times when the evacuated chamber 7 must be opened for servicing or changing the sample 3 or the alpha particle source 1. A sample mount 4 holds a plurality of samples within the vacuum chamber. It permits selection of a given sample by rotation from outside the chamber as well as adjustments in the distance between the alpha particle source and the sample under analysis. The suppression field 10 in the embodiment of FIGS. 1 and 3 is developed by permanent magnet 13 but can also be developed by an electromagnetic means or both.

Figure 2:
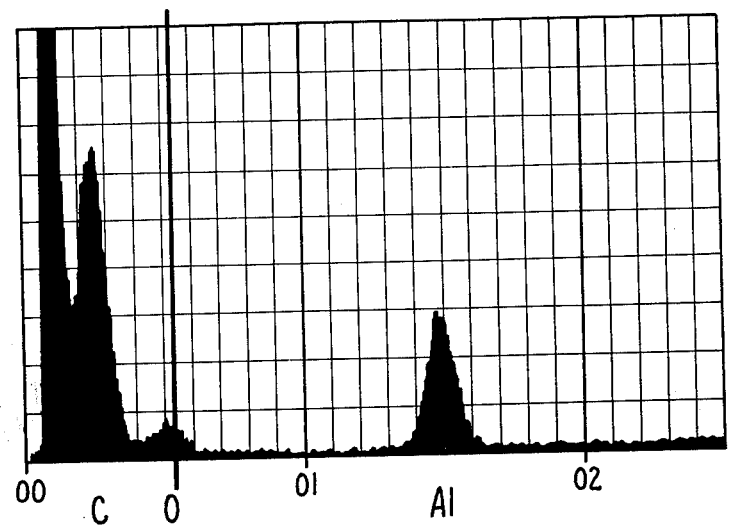
FIG. 2 illustrates a typical analysis using the system of FIGS. 1 and 3 to detect carbon, oxygen and aluminum in a sample.

FIG. 2 illustrates the highly resolved spectral lines for several low atomic weight elements with very low background which are obtainable with the system of FIGS. 1 and 3. Previous systems did not recognize the presence and detrimental effects of charged particles in the radiation field striking the detector and did not provide for excluding charged particle radiation from the detector. Thus, the background amplitude was more than tenfold greater than that for the present invention (as shown in FIG. 2).

Figure 4:
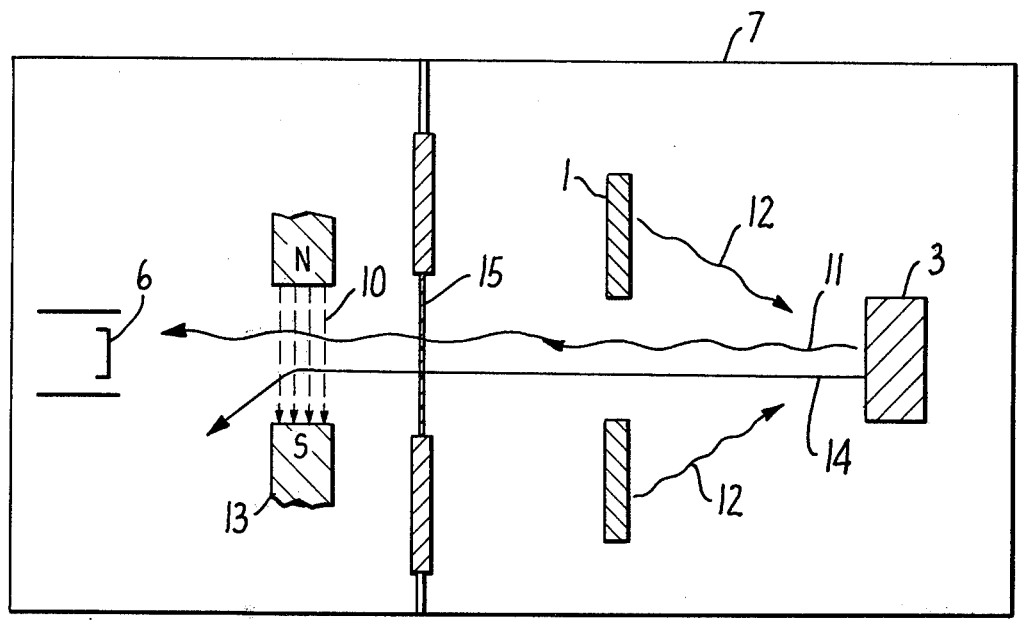
FIG. 4 is a schematic illustration of the system of FIG. 1 further including a thin foil barrier separating evacuated regions which prevents condensibles in the system from coating the detector typically held at liquid nitrogen temperatures.

FIG. 4 illustrates a variation of the system described in FIGS. 1 and 3. Here, alpha particles 12 and gamma rays are emitted from a radioactive isotope source 1, such as $96Cm^{244}$, and impinge upon the sample 3 to produce x-rays 11 and electrons 14. The net alpha energy is approximately 5.0 meV, and the strongest gamma ray of significance produced by the isotope has an energy of about 42 KeV, which establishes the high energy end point of the electrons to be defined from reaching the detector 6. A Mylar foil 15 of approximately 0.0001 inch thickness is placed between the sample 3 and the detector 6 to act as a barrier separating evacuated regions within the evacuated chamber 7. The Mylar foil 15 is too thin to stop the energetic electrons 14, but does intercept thermally drifting vacuum contaminants and prevents them from condensing on the surface of detector 6. A charged particle suppression field 10 produced by a cobalt rare earth permanent magnet 13 of typically 4,000 gauss field strength sweeps out all electrons 14 and other charged particles which have magnetic rigidities less than 50 gauss-meters and prevents them from striking the detector and, hence, causing undesirable background counts.

As shown in FIG. 5, a second charged particle suppression field 10' between the alpha particle source 1 and the sample 3 deflects unwanted charge particles 16, such as electrons, and prevents them from impinging upon the sample 3; thus, the only charged particles generating x-rays are the alpha particles. This additional suppression field 10' is developed by another cobalt rare earth magnet 13'. It causes the unwanted particles 16 to be bent aside, but has no significant affect on the high energy particles 12 which continue on to the sample 3. Only the x-rays 11 excited by the alpha particle bombardment are detected because the suppression field 10 located between the sample 3 and the detector 6 prohibits electrons and low energy ions from reaching the detector 6. Additional shielding for detector 6 is provided by the magnet 13, itself, which in this geometry by its mass shields the detector from the natural electromagnetic radiation 17 of the radioisotope source 1.

Improved performance of the invention can be achieved by placing the alpha particle source 1 remotely at some distance from the sample 3 as is illustrated in FIG. 6. In such an arrangement, the source 1 may be enclosed within a security container 20 which insures its integrity even under adverse physical abuse. Emitted alpha particle 12 are sent through an energy spectrometer 21 and collimation geometry 22, 23. A multiple lens focusing system 24, such as quadrapole lenses, is followed by an alpha particle deflection means 25. The deflection means 25 bends the beam of alpha particles 12, independently, in horizontal and vertical directions, thereby permitting the beam spot to be scanned across the sample in two dimensions for x-ray mapping or imaging. In this particular embodiment, line-of-sight between the radioactive source 1 and the sample 3 is eliminated so as to prevent unwanted source gamma rays from reaching the sample. In this embodiment the suppression field for unwanted charged particles comprises an electrostatic field 30 defined by a pair of flat plates 31 across which is applied a d-c potential by a suitable d-c voltage source 32.

True near-surface analysis of irradiated specimens can be accomplished by taking advantage of the radiationless transitions occurring simultaneously with the x-ray transitions. The radiationless transitions yield Auger electrons. Only those Auger electrons produced at or within about 30 Angstrom units of the sample surface can escape the sample with their characteristic energies. Thus the discrete Auger electron energy levels reveal the chemical state of only the first ten layers of surface atoms. As illustrated in FIG. 7, alpha particles 12 emitted from a suitable radioisotope source 1 impinge upon the sample under analysis 3. Fluorescent x-rays 11 and Auger electrons 26 are sorted simultaneously along two channels. A detector 6, protected by charged particle suppression field 10 created by a magnet means 13, analyzes the characteristic x-rays 11. The Auger electrons 26 are analyzed simultaneously through a collimation system 27 and sensitive electron spectrometer 28. In this manner identification of the surface elements can be made simultaneously with the x-ray identification at detector 6.

We claim:
1. An x-ray energy spectrometer system having a source emitting alpha particles which impinge upon a sample under analysis to produce characteristic x-rays of the sample material, the improvement comprising
  (a) a windowless energy dispersive solid state detector for detecting the characteristic x-rays;
  (b) a charged particle suppression field preventing charged particles from impinging upon said detector; and

(c) an evacuated chamber containing the sample, source and the detector.

2. The system of claim 1 wherein the charged particle suppression field comprises a magnetic field acting transversely to the path of characteristic x-rays from said sample to said detector.

3. The system of claim 1 wherein the charged particle suppression field comprises an electrostatic field acting transversely to the path of characteristic x-rays from said sample to said detector.

4. The system of claim 1 wherein a contaminant barrier is located in the path of the characteristic x-rays between said sample and said detector.

5. The system of claim 1 wherein the means developing said charged particle suppression field is located to shield physically said detector from said source.

6. The system of claim 1 wherein said source is remotely located from said evacuated chamber and further comprising transport means conducting a beam of alpha particles from the source to the sample.

7. The system of claim 6 wherein said transport means includes focusing means for the beam of alpha particles.

8. The system of claim 6 wherein said transport means includes beam deflection means whereby said beam may be shifted so as to scan the surface of the sample.

9. The system of claim 6 wherein the source and sample are so located that a direct line-of-sight path does not exist between said source and said sample.

10. The system of claim 1 further including a second charged particle suppression field located between said source and said sample to prevent unwanted charged particles from impinging upon said sample.

11. The system of claim 1 further including analysis means for Auger electrons emitted from said sample.

* * * * *